US009801091B2

(12) United States Patent
Liu et al.

(10) Patent No.: US 9,801,091 B2
(45) Date of Patent: Oct. 24, 2017

(54) UPLINK LOAD CONTROL METHOD AND APPARATUS USED IN A WIRELESS COMMUNICATION SYSTEM

(75) Inventors: Jinhua Liu, Beijing (CN); Zhang Zhang, Beijing (CN); Mats Blomgren, Stockholm (SE); Klas Johansson, Sundbyberg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 328 days.

(21) Appl. No.: 14/356,620

(22) PCT Filed: Nov. 11, 2011

(86) PCT No.: PCT/CN2011/001888
§ 371 (c)(1),
(2), (4) Date: May 7, 2014

(87) PCT Pub. No.: WO2013/067656
PCT Pub. Date: May 16, 2013

(65) Prior Publication Data
US 2014/0301193 A1 Oct. 9, 2014

(51) Int. Cl.
*H04L 12/26* (2006.01)
*H04W 28/02* (2009.01)
*H04W 52/34* (2009.01)

(52) U.S. Cl.
CPC ... *H04W 28/0284* (2013.01); *H04W 28/0236* (2013.01); *H04W 28/0289* (2013.01); *H04W 52/343* (2013.01)

(58) Field of Classification Search
USPC .......... 370/229–348, 477–550; 455/423–561
See application file for complete search history.

(56) References Cited

U.S. PATENT DOCUMENTS 6,577,875 B1 * 6/2003 Brouwer ............. H04W 52/146
370/317
6,671,512 B2 * 12/2003 Laakso ............... H04W 52/346
455/450
(Continued)

FOREIGN PATENT DOCUMENTS

CN 1859804 A 11/2006
CN 101026888 A 8/2007
(Continued)

*Primary Examiner* — Man Phan
(74) *Attorney, Agent, or Firm* — Coats & Bennett, PLLC

(57) ABSTRACT

The present invention discloses schemes to perform load control taking uplink BLER statistics into account. An uplink load control method and apparatus are provided in a wireless communication system. The uplink load control method comprises estimating uplink load budget in a cell of the wireless communication system; determining whether the cell is over-loaded based on Block Error Rate (BLER) statistics of non-Guarded Bit Rate (non-GBR) users in the cell and/or Fast Congestion Control (FCC) action statistics in the cell; decreasing the uplink load budget if it is determined that the cell is over-loaded; and increasing the uplink load budget if it is determined that the cell is not over-loaded. Preferably, increasing or decreasing of the uplink load budget is based on the BLER stastics $BLER_{statistic}$ of targeted users by FCC. By means of the BLER and FCC status, BLER of EUL users can be controlled in an acceptable range while maximizing the benefit of FCC in improving load utilization and consequently uplink throughput as much as possible. On the other hand, the uplink load control method can further comprises adjusting a RoT target $RoT_{tgt}$, based on BLER statistics of Guarded Bit Rate (GBR) users in order to increase load headroom available for non-GBR users in appropriate conditions without violating the performance of GBR users.

16 Claims, 3 Drawing Sheets

(56) References Cited

U.S. PATENT DOCUMENTS

| | | | | |
|---|---|---|---|---|
| 6,983,153 B2* | 1/2006 | Jain | H04W 28/12 | 455/453 |
| 7,120,448 B2* | 10/2006 | Brouwer | H04L 1/0001 | 370/318 |
| 7,414,990 B2* | 8/2008 | Gilliland | H04W 28/18 | 370/235 |
| 8,320,266 B2* | 11/2012 | Wang Helmersson | H04W 52/343 | 370/252 |
| 8,325,734 B2* | 12/2012 | Budka | H04W 72/1284 | 370/395.4 |
| 8,383,969 B2* | 2/2013 | Mittu | H02B 11/133 | 200/50.21 |
| 8,401,585 B2* | 3/2013 | Bottomley | H04W 52/08 | 370/318 |
| 8,477,603 B2* | 7/2013 | Sambhwani | H04J 11/0026 | 370/229 |
| 8,515,466 B2* | 8/2013 | Zhang | H04W 28/08 | 370/329 |
| 2003/0003921 A1* | 1/2003 | Laakso | H04W 52/343 | 455/453 |
| 2003/0228871 A1* | 12/2003 | Bernhard | H04W 28/08 | 455/452.2 |
| 2011/0039544 A1* | 2/2011 | Fulghum | H04L 1/0002 | 455/423 |
| 2011/0053631 A1 | 3/2011 | Bottomley et al. | | |
| 2011/0255432 A1 | 10/2011 | Sambhwani et al. | | |
| 2012/0201134 A1* | 8/2012 | Wang Helmersson | H04W 52/146 | 370/230 |
| 2013/0225225 A1* | 8/2013 | Persson | H04W 52/288 | 455/522 |
| 2014/0286161 A1* | 9/2014 | Zhang | H04W 52/241 | 370/230 |

FOREIGN PATENT DOCUMENTS

| | | |
|---|---|---|
| CN | 101027921 A | 8/2007 |
| WO | 0180575 A3 | 10/2001 |

* cited by examiner

UPLINK LOAD CONTROL METHOD AND APPARATUS USED IN A WIRELESS COMMUNICATION SYSTEM

TECHNICAL FIELD

The invention relates to an uplink load control method and uplink load control apparatus used in a wireless communication system.

BACKGROUND

In the uplink of a wireless communication system, the common radio resource shared among the user terminals is the total amount of tolerable interference, which is defined as the average interference over all the RX antennas. A relative measure of total interference is Rise over Thermal (RoT), i.e. total interference relative to thermal noise.

The total uplink load budget that is shared amongst all uplink users in one cell can be estimated as in Equation 1

$$L_{UL} = 1 - \frac{1}{RoT_{tgt}} - L_{margin} \qquad \text{Equation 1}$$

Where $L_{UL}$ is the total uplink load budget, $RoT_{tgt}$ is the RoT target, $L_{margin}$ is the reserved load margin to deal with the inter-cell interference that is not monitored and the intra-cell interference oscillation.

The RoT level in a cell impacts the coverage and uplink (UL) capacity, i.e., a higher RoT level means a higher uplink load available for a cell but a smaller coverage. The coverage (target RoT) is limited by the Guarded Bit Rate (GBR) users and or the desired minimum required bit-rate of best effort users at the cell edge.

Uplink Load Control

The uplink load control estimates the resource utilization in terms of cell load generated by different type of traffic and channels of each cell based on measurements, such as, Rise over Thermal or Received Total Wideband Power (RTWP). The load control also determines and allocates the total usable Enhanced Uplink (EUL) load, which includes the allocated load headroom for the EUL users and the available EUL load that can be further allocated. Moreover the load control detects the congestion based on the uplink (UL) load usage. For instance, the load control detects the congestion when the measured RoT exceeds the RoT target level. FIG. 1 illustrates the following several load control schemes for handling the detected congestion.

Uplink Scheduling

The EUL scheduler is supposed to allocate the available UL load to EUL users who require higher uplink bit-rate and reduce the granted uplink bit-rate of some EUL users when the system is overloaded. In the current WCDMA-EUL system, according to the available EUL load and the bandwidth request of an EUL user, the EUL scheduler estimates an Enhanced Dedicated Channel (E-DCH) power offset and signals this E-DCH power offset to this User Equipment (UE) by the Enhanced Absolute Grant Channel (E-AGCH). The UE maps the received E-DCH power offset to a maximum Enhanced Transport Format Combination (E-TFC) it can use. The granted bit-rate depends on this maximum E-TFC. Another way to adjust the UE bit-rate is to use the Enhanced Relative Grant Channel (E-RGCH), which is used to increase or decrease the granted bit-rate in a predefined relative step.

In principle, when the measured UL load in a cell exceeds a certain predetermined threshold, e.g. the measured UL RoT of that cell exceeds the RoT target, the UL load control reduces the total usable Enhanced Uplink (EUL) load for that cell and the UL scheduler reduces the granted bit-rate of some EUL users accordingly. Because there is a large delay in this procedure, including RoT measurement delay, Node B processing delay, E-RGCH/E-AGCH queuing delay and UE processing delay etc, large RoT oscillation can occur, either higher or lower than the RoT target, and the RoT peak can last a long time before the RoT is reduced to an acceptable level. The total delay in this procedure can be several tens of milliseconds or even longer. This means that the RoT can not be efficiently controlled by means of reducing the granted bit-rate by the scheduler only. Moreover, the RoT can be decreased to a too low level and the uplink scheduler has to increase the granted bit-rate of some users slowly from a low granted bit-rate, which results in uplink resource waste.

BLER Controlling

For both Release 99 and EUL, the uplink data transmission aims at a configured Block Error Rate (BLER) target. There is an outer loop power control to ensure that the BLER target is met when the target transmit attempt is reached by adjusting the Dedicated Physical Control Channel (DPCCH) Signal Interference Ratio (SIR) target for each UE.

For some delay sensitive services (e.g. VoIP) over EUL, it is important that the configured BLER target is always met when the target transmit attempt is reached in order to fulfil the delay requirement. While for some non delay sensitive services over EUL, some variation in BLER can be tolerable, but still the BLER should not be too high to avoid performance degradation.

For service over DCH, it is required that the BLER target can be met so that the RLC retransmission probability can be kept in minimum level.

Fast Congestion Control

In order to reduce the RoT peak level and suppress the RoT peak quickly, Fast Congestion Control (FCC) was introduced. In WO/2001/080575 and US 2003/0003921 A1, it is proposed that Transmit Power Control (TPC) down commands are sent to targetable users when the measured RoT exceeds the target level. For a selected UE to be targeted by FCC, If the TPC generated by the inner loop power control is TPC DOWN command, TPC down command is sent to this UE without changing the TPC command.

If the TPC generated by the inner loop power control is TPC UP command, FCC changes the TPC command to down and the TPC down command is sent to this UE, which is referred as the forced TPC down command hereinafter.

When the RoT exceeds the RoT target, the FCC is triggered much faster than the scheduler, which means that FCC can decrease RoT oscillation and improve UL load utilization. The uplink scheduler will reduce the granted bit-rate of EUL users if FCC alone is not enough to suppress the RoT to the target level, e.g. the predefined minimum DPCCH SINR is hit for all users that can be targeted by FCC. According to the previous study, FCC scheme has shown considerable gain even there are RoT measurement errors and delays. Moreover, FCC can be a low cost implementation for considerable gain in future.

However, the BLER of the targeted users by FCC will increase accordingly. According to the Section "BLER controlling" above, it is preferable to only target the users with non-delay-sensitive users over EUL.

Therefore, the above prior art load control schemes have the following problems:

1. Low Uplink Resource Utilization with the Prior Art Load Control

FCC is a promising method to suppress RoT peaks, but the BLER of the targeted users by FCC may increase evidently, and there is no means to explicitly control the increased BLER due to the adoption of FCC. This results in quite conservative use of FCC even with FCC enabled. On the other hand, still to quite some extent we need to rely on the prior art load control and scheduler to control the uplink load and RoT, however, as mentioned in section "Uplink scheduling" the large delay in the load control and scheduler will still result in insufficient uplink load utilization.

2. The RoT Target is Conservatively Configured to Ensure the Coverage of the Worst Case With a high RoT target, the system can benefit from the high load utilization but the system can suffer coverage problem. With a low RoT target, the system has good coverage but bad capacity.

SUMMARY

In order to solve at least one of the aforementioned problems in the prior art, the invention provides an improved uplink load control method and uplink load control apparatus used in a wireless communication system.

According to an aspect of the invention, an uplink load control method is provided for using in a wireless communication system. The uplink load control method comprises: estimating uplink load budget in a cell of the wireless communication system; determining whether the cell is over-loaded based on Block Error Rate (BLER) statistics of users in the cell and/or Fast Congestion Control (FCC) action statistics in the cell; decreasing the uplink load budget if it is determined that the cell is over-loaded.

Preferably, the uplink load control method further comprises increasing the uplink load budget if it is determined that the cell is not over-loaded.

Preferably, the over-load determination is based on BLER statistics of non-Guarded Bit Rate (non-GBR) users in the cell.

Preferably, the over-load is determined if the BLER statistics $BLER_{statistic}$ of the non-GBR users exceeds a predetermined BLER target $BLER_{tgt,sch}$ and/ or the FCC action statistics exceeds a predetermined threshold.

Preferably, the FCC action statistics comprise any one of the following:

the ratio of FCC active time that FCC is suppressing RoT peaks to a predetermined FCC monitoring period; and the ratio of the forced TPC down commands to the total TPC commands of targeted users by FCC within a predetermined FCC action monitoring period.

Preferably, increasing or decreasing of the uplink load budget is based on the BLER stastics $BLER_{statistic}$ of targeted users by FCC.

Preferably, the uplink load budget comprises Enhanced Uplink (EUL) load budget for EUL users, wherein the EUL load budget is decreased according to:

$$L_{eul,1}=L_{eul}-X_1(BLER_{statistic}-BLER_{tgt,sch})$$

where $L_{eul}$ and $L_{eul,1}$ are respectively the EUL load budget before and after the decrease of the EUL load budget, $X_1$ is the coefficient to control the speed to decrease the EUL load budget; and/or wherein the EUL load budget is increased according to the following formulas:

$$L_{eul,2}=L_{eul}-X_2(BLER_{statistic}-BLER_{tgt,sch})$$

where $L_{eul}$ and $L_{eul,2}$ are respectively the EUL load budget before and after the increase of the EUL load budget, $X_2$ is the coefficient to control the speed to increase the EUL load budget.

Preferably, the uplink load control method further comprises adjusting a RoT target $RoT_{tgt}$, based on BLER statistics of Guarded Bit Rate (GBR) users.

According to another aspect of the invention, an uplink load control apparatus is provided for using in a wireless communication system. The uplink load control apparatus comprises: a load estimator for estimating the uplink load budget in a cell of the wireless communication system; an over-load determining unit for determining whether the cell is over-loaded based on Block Error Rate BLER statistics of users in the cell and/or Fast Congestion Control (FCC) action statistics in the cell; and an over-load handling unit for decreasing the uplink load budget if the over-load determining unit determines the cell is over-loaded.

Preferably, the over-load handling unit is further adapted to increase the uplink load budget if the over-load determining unit determines the cell is not over-loaded.

Preferably, the over-load determining unit is adapted to determine whether the cell is over-loaded based on BLER statistics of non-Guarded Bit Rate (non-GBR) users in the cell.

Preferably, the uplink load control apparatus further comprises:

a Block Error Rate (BLER) monitoring unit for measuring Block Error Rate (BLER) statistics of the non-GBR users in the cell; and/or a Fast Congestion Control (FCC) monitoring unit for measuring FCC action statistics of a FCC unit in the cell.

Preferably, the over-load determining unit is adapted to determine the cell is over-loaded if the BLER statistics $BLER_{statestic}$ exceeds a predetermined BLER target $BLERt-gt,sch$ and/ or the FCC action statistics exceeds a predetermined threshold.

Preferably, the over-load handling unit is adapted to increases or decrease the uplink load budget based on the BLER stastics $BLER_{statistic}$ of targeted users by FCC.

Preferably, the uplink load budget comprises Enhanced Uplink (EUL) load budget for EUL users, wherein the over-load handling unit is adapted to decrease the EUL load budget according to:

$$L_{eul,1}=L_{eul}-X_1(BLER_{statistic}-BLER_{tgt,sch})$$

where $L_{eul}$ and $L_{eul,1}$ are respectively the EUL load budget before and after the decrease of the EUL load budget, $X_1$ is the coefficient to control the speed to decrease the EUL load budget;

and/or wherein the over-load handling unit is adapted to increase the EUL load budget according to the following formulas:

$$L_{eul,2}=L_{eul}-X_2(BLER_{statistic}-BLER_{tgt,sch})$$

where $L_{eul}$ and $L_{eul,2}$ are respectively the EUL load budget before and after the increase of the EUL load budget, $X_2$ is the coefficient to control the speed to increase the EUL load budget.

Preferably, the uplink load control apparatus further comprises a RoT target adjusting unit for adjusting a RoT target $RoT_{tgt}$ based on BLER statistics of Guarded Bit Rate (GBR) users.

According to another aspect of the invention, a base station comprising the uplink load control apparatus as given above is provided.

By means of the above solutions, embodiments of the invention can achieve at least one of the following advantages:

- The BLER of EUL users in presence of FCC can be controlled in an acceptable range.
- The UL load utilization can be largely improved with an aggressive UL load allocation without violating GBR user's performance
- The implementation cost is low.
- There is not standardization effort required

BRIEF DESCRIPTION OF THE DRAWINGS

The invention will now be discussed in more detail with reference to the figures, in which.

Figure 1:
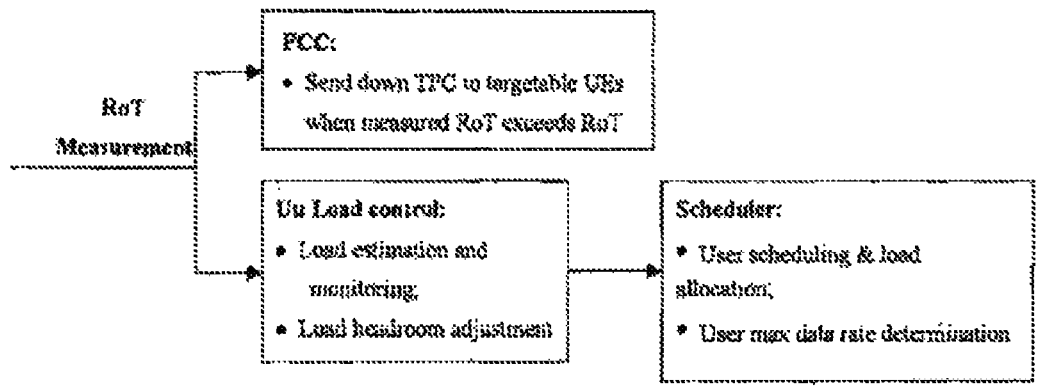
FIG. 1 schematically illustrates a prior art UL load control and EUL scheduling scheme with FCC.

Throughout the figures, same reference numerals indicate similar or corresponding features. Some of the features indicated in the drawings are typically implemented in software, and as such represent software entities, such as software modules or objects. But the invention is not limited thereto. Said features can also be implemented in hardware, firmware or any combination of software, hardware and firmware.

DETAILED DESCRIPTION

Figure 2:
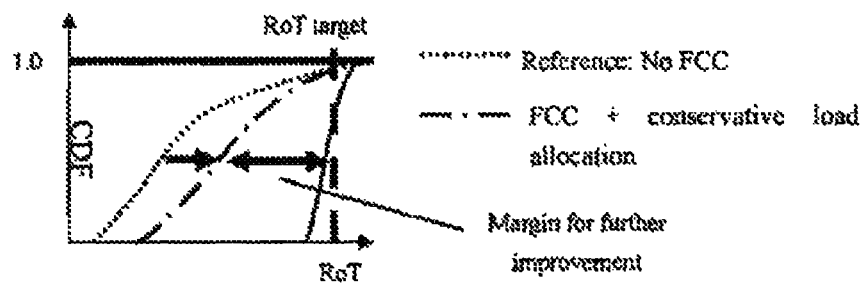
FIG. 2 schematically illustrates the performance comparison between the UL resource Utilization in the prior art solutions and in the invention, respectively.

FIG. 2 schematically illustrates the performance comparison between the UL resource Utilization in the prior art solutions and in the invention, respectively. From the illustration, we can see clearly that the invention greatly improve the UL resource Utilization in comparison with the prior art load control schemes with or without FCC.

Figure 3:
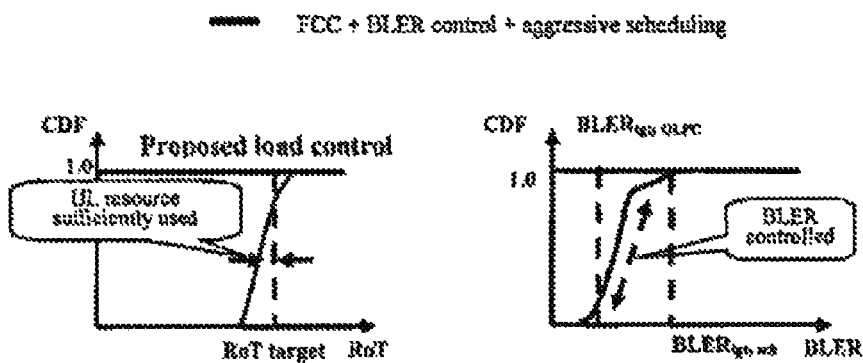
FIG. 3 schematically illustrates the expected UL resource utilization and BLER performance of the invention.

FIG. 3 schematically illustrates the expected UL resource utilization and BLER performance of the invention. From the first diagram similar to FIG. 2, we can see that the UL resource is sufficiently utilized. From the second diagram, we can see that the BLER statistics is well controlled below the target BLER of UE scheduler, i.e. $BLER_{tgt,sch}$, which is the maximum allowable BLER for the served EUL users. The uplink load utilization can be increased due to the fact that the increase/decrease of UL granted bit-rate by the scheduler impacts the UL BLER rather than the taken load by the served users.

Figure 4:
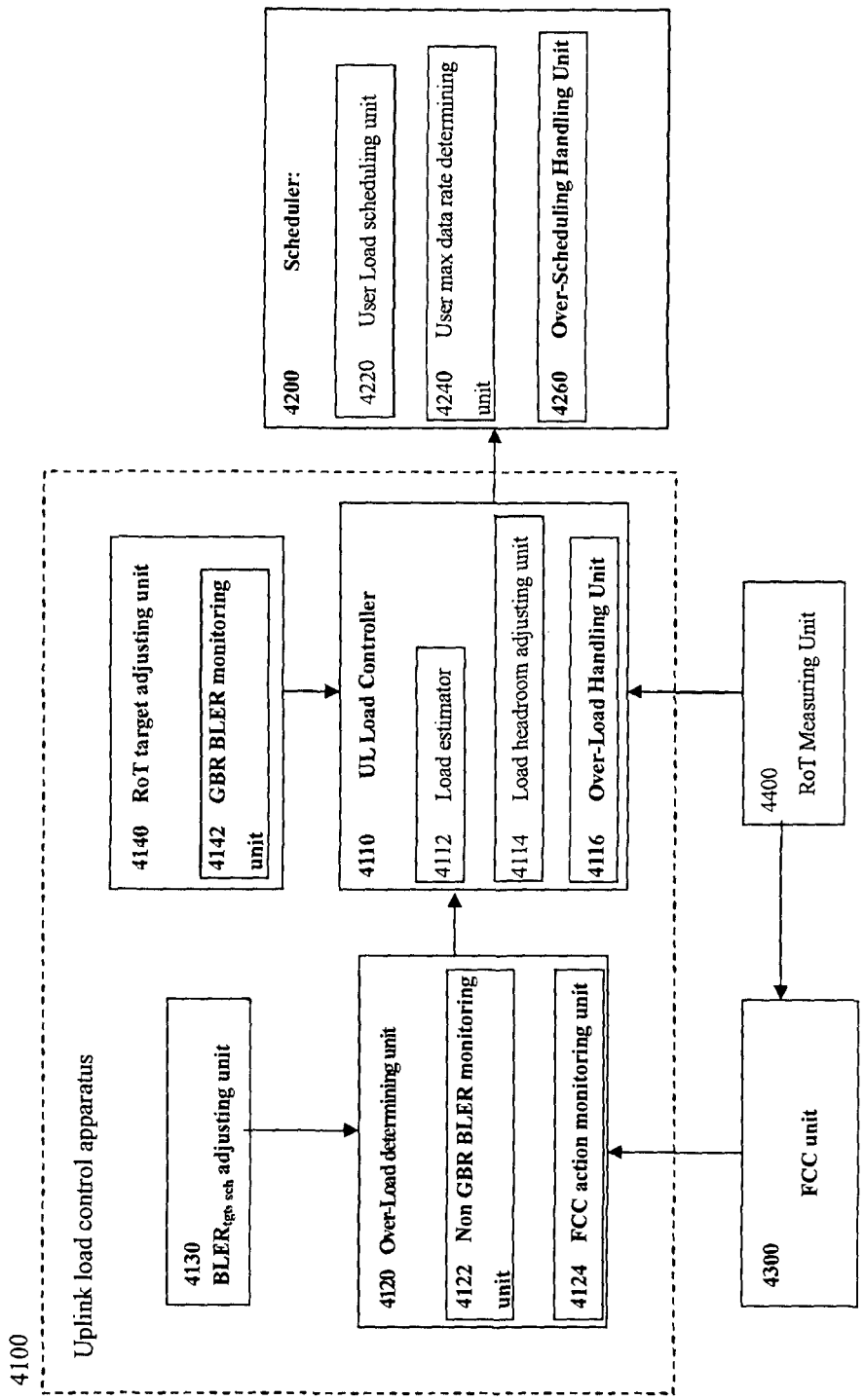
FIG. 4 schematically illustrates functionality modules of UL load control and scheduling system according to an embodiment of the invention.

FIG. 4 schematically illustrates functionality modules of UL load control and scheduling system 4000 according to an embodiment of the invention. As illustrated, the UL load control and scheduling system 4000 comprises an uplink load control apparatus 4100 for controlling the total uplink load budget in a cell where it is located based on Block Error Rate (BLER) statistics of users in the cell and/or Fast Congestion Control (FCC) action statistics in the cell, a scheduler 4200 for scheduling load to users based on the total uplink load budget, a FCC unit 4300 for performing FCC functions and a RoT measuring unit 4400 for measuring the RoT value in the cell. The FCC unit 4300 is similar to that illustrated in FIG. 1 and sends TPC down command to targetable UEs when measured RoT exceeds RoT target.

According to an embodiment, the uplink load control apparatus 4100 performs BLER controlled aggressive load allocation with FCC. As illustrated, the uplink load control apparatus 4100 comprises UL load controller 4110, an over-load determining unit 4120 for determining whether over-load occurs, optionally a $BLER_{tgt,sch}$ adjusting unit 4130 ($BLER_{tgt,sch}$ refers to the target BLER for the scheduler 4200) and a RoT target adjusting unit 4140 which comprises a GBR BLER monitoring unit 4142 for monitoring the BLER of the GBR users and which adjusts the RoT target based on the measured BLER of the GBR users in order to obtain as much load headroom as possible for the non-GBR users without violating the performance of the GBR users.

The UL load controller 4110 further comprises a load estimator 4112 for estimating the total uplink load budget in the cell, a load headroom adjusting unit 4114 for increasing or decreasing the load headroom schedulable by the scheduler 4200 according to whether the measured RoT exceeds the RoT target or not and an over-load handling unit 4116 for performing over-load actions which will be explained in details hereinafter.

The over-load determining unit 4120 further comprises a Non GBR BLER monitoring unit 4122 for performing BLER monitoring and a FCC action monitoring unit 4124 for performing FCC action monitoring. Below, the BLER monitoring, FCC action monitoring and the over-load determination will be explained in details.

Typically, the uplink load control apparatus 4100 can be used as part of a base station.

BLER Monitoring

The BLER monitoring can be monitored in various methods in Node B. In an embodiment of the invention, the serving cell can monitor respectively BLER of the targeted users by FCC and the BLER of the GBR users respectively through the Non GBR BLER monitoring unit 4122 and GBR BLER monitoring unit 4142, in order for controlling the BLER of both targeted users by FCC and the coverage of GBR users. The BLER monitoring of the non-serving cell users is not mandatory regardless whether these users are targeted by FCC or not. The following are 2 examples:

EXAMPLE 1

BLER is monitored based on the transmission error ratio calculated as the number of erroneous transmission blocks at the Target Transmission Attempt (TTA) relative to the total number of transmission blocks for the group of users within a predetermined measurement period, which is shown in Equation 2

$$BLER_{statistic} = \frac{\sum\limits_{targeted\ users} N_{error}}{\sum\limits_{targeted\ users} N_{TX}} \quad \text{Equation 2}$$

Where $BLER_{statistic}$ is transmission error ratio, $$\sum\limits_{targeted\ users} N_{error}$$

is the total number of the transport blocks that are not correctly received at the TTA of the group of users targeted by FCC and $$\sum_{targeted\ users} N_{TX}$$

is the total number of transport blocks for the group of users within a predetermined measurement period.

EXAMPLE 2

BLER is monitored by dividing the accumulated bits of all transmission blocks that are not correctly received at the TTA by the total number of bits of all transmitted blocks of the group of users within a predetermined measurement period, which is shown as Equation 3.

$$BLER_{statistic} = \frac{\sum_{targeted\ users} transportBlockSize_{error}}{\sum_{targeted\ users} transportBlockSize_{TX}} \quad \text{Equation 3}$$

Where $$\sum_{targeted\ users} transportBlockSize_{error}$$

is total number of bits of the transport blocks that are not correctly received at the TTA of the group of users and $$\sum_{targeted\ users} transportBlockSize_{TX}$$

is total number of bits of the transport blocks of the group of users within a predetermined measurement period.

Some filtering can be applied with the BLER measurements mentioned above. For instance, an attack-decay filter as Equation 5 can be used.

$$BLER_{statistic}(n) = \alpha \cdot BLER_{statistic}(n-1) + (1-\alpha) \cdot BLER_{statistic} \quad \text{Equation 5}$$

Where $BLER_{statistic}(n)$ is the filtered BLER in the current BLER measurement period, $BLER_{statistic}(n-1)$ is the filtered BLER in the last BLER measurement period, $BLER_{statistic}$ is the measured BLER in the current BLER measurement period and $\alpha$ is the filter coefficient.

FCC Action Monitoring

The FCC action monitoring can be based on the FCC action statistics regardless of the targeted users by FCC is serving cell user or not. The following are 2 examples, which can be implemented in Node B.

EXAMPLE 1

FCC action statistics is monitored based on the FCC active time ratio that FCC is suppressing the RoT peaks during a predetermined FCC monitoring period, which is shown in Equation 6.

$$R_{FCC} = \frac{\sum_{in\ a\ meas\ period} t_{FCC}}{T_{meas\ period}} \quad \text{Equation 6}$$

Where $R_{FCC}$ is the FCC active time ratio which indicates how often FCC is suppressing the RoT peaks, $$\sum_{in\ a\ meas\ period} t_{FCC}$$

is the sum time during which FCC is suppressing the RoT peaks and $T_{meas\ period}$ is the predetermined FCC action monitoring period.

EXAMPLE 2

FCC action statistics is monitored based on the ratio of the forced TPC down commands to the total TPC commands of the targeted users . by FCC within a predetermined FCC action monitoring period, which is shown in Equation 7.

$$R_{FCC} = \frac{\sum_{in\ a\ meas\ period} N_{forced\ TPC\ down}}{\sum_{in\ a\ meas\ period} N_{TPC}} \quad \text{Equation 7}$$

Where $$\sum_{in\ a\ meas\ period} N_{forced\ TPC\ down}$$

is the sum number of forced TPC down commands of all targeted users by FCC and $$\sum_{in\ a\ meas\ period} N_{TPC}$$

is the sum number of TPC commands of all targeted users by FCC.

Over-Load Determination

This functionality of the over-load determining unit 4120 is to determine whether to trigger over-load actions. The over-load actions means the allocated load of the selected target EUL users is decreased. A BLER target, which is expressed as $BLER_{tgt,\ sch}$, and a FCC action ratio threshold, which is expressed as $R_{thres,\ FCC}$, can be defined to assist the over-load detection. Some rules can be predefined for the over-load determination. The following are 3 examples Example 1 An over-load action is triggered if the target EUL user's BLER exceeds the $BLER_{tgt,\ sch}$ and FCC action ratio exceeds $R_{thres,FCC}$.

Example 2 In case that the $BLER_{tgt,\ sch}$ is higher than the BLER target of the outer loop power control, an over-load action can be triggered if the target EUL users' BLER exceeds the $BLER_{tgt,sch}$.

Example 3 An over-load action is triggered if FCC action ratio exceeds $R_{thres,\ FCC}$.

When the FCC action is executed, the SIR target of the targeted users should preferably be frozen during the time period that the RoT is being suppressed by the FCC.

$BLER_{tgt, sch}$ can be different for different services. Also $BLER_{tgt,sch}$ can be different for the same type of service over different radio bears. As detailed hereinafter in relation to the $BLER_{tgt, sch}$ adjusting unit 4130, the $BLER_{tgt, sch}$ can be adjusted, for example, according to the preferences of the network operator.

Over-Load Action

At the start of each EUL scheduling period, the total usable UL load for EUL users, i.e. the total uplink load budget, is estimated in Equation 8.

$$L_{eul} = 1 - 1/RoT_{tgt} - L_{DCH} - L_{HS-DPCCH} - L_{margin} \quad \text{Equation 8}$$

where $L_{eul}$ is the total usable load for EUL users. $L_{eul}$ includes the EUL load already allocated and the available EUL load room to be allocated for EUL users wherein $RoT_{tgt}$ is the target Rise of Thermal RoT, $L_{DCH}$ and $L_{HS-DPCCH}$ are respectively loads allocated to Dedicated Chanel (DCH) and High Speed-Dedicated Control Chanel (HS-DPCCH).

Then the over-load detection is done based on the BLER statistic of targeted users by FCC and FCC active time ratio $R_{FCC}$ as explained in the Section of "Over-Load Determination". The reason to monitor the activity of the FCC algorithm is that there could be other reasons than FCC resulting in high BLER. In such cases there is little point in adjusting the FCC algorithm.

If the BLER statistic of the targeted EUL users by FCC, $BLER_{statistic}$, is lower than the target BLER of the scheduler $BLER_{tgt,sch}$ and/or the FCC ratio $R_{FCC}$ does not exceed the predetermined threshold $R_{thres, FCC}$, the uplink load control apparatus 4100 can allocate the uplink load for EUL users in an aggressive way. The total usable load for EUL users is allocated in an aggressive manner as shown in Equation 9

$$L_{eul,1} = L_{eul} - X_1(BLER_{statistic} - BLER_{tgt,sch}) \quad \text{Equation 9}$$

Where $BLER_{statistic}$ is the BLER statistics of the targeted EUL users by FCC and $X_1$ is the coefficient to control how fast the adjustment based on $BLER_{tgt, sch}$ should operate.

Or equivalently to some extent, the total usable load for EUL users can be increased by decreasing $L_{margin}$ by one step as in Equation 10

$$L_{margin,1} = L_{margin} - \Delta_1 \quad \text{Equation 10}$$

where $\Delta_1$ is the step to reduce the uplink load margin.

In this way, the total usable load for EUL users can be allocated using Equation 8 and Equation 9 (directly increase the total usable load for EUL users) or using Equation 8 and Equation 10 (via the updated load margin $L_{margin,1}$).

If the BLER statistic of the targeted EUL users by FCC is higher than the target BLER of the scheduler $BLER_{tgt,sch}$ and/or FCC ratio $R_{FCC}$ exceeds the predetermined threshold $R_{thres, FCC}$, the over-load action is triggered. In this case, the total load usable by EUL users is decreased as in Equation 11

$$L_{eul,2} = L_{eul} - X_2(BLER_{statistic} - BLER_{tgt,sch}) \quad \text{Equation 11}$$

where $X_2$ is the coefficient to control the speed to reduce the available schedulable uplink load.

Or equivalently to some extent, the total load usable by EUL users is decreased by increasing $L_{margin}$ by one step as in Equation 12

$$L_{margin,2} = L_{margin} + \Delta_2 \quad \text{Equation 12}$$

where $\Delta_2$ is the step to increase the load margin.

In this way, the total usable load for EUL users can be allocated using Equation 8 and Equation 11 (directly decrease the total usable load for EUL users) or using Equation 8 and Equation 12 (via the updated load margin $L_{margin,2}$).

In practice, $X_1$ and $X_2$ can be different. $\Delta_1$ and $\Delta_2$ can also be different.

In case that the UL scheduler decides to reduce the granted bit-rate of a UE whose transmit bit-rate is clearly lower than the granted bit-rate, the granted bit-rate reduction should be based on the transmit bit-rate of this UE in order to effectively reduce the allocated EUL load.

The $BLER_{tgt, sch}$ adjusting unit 4130 is used to adjust the $BLER_{tgt,sch}$ according to the preferences of the network operator. The $BLER_{tgt, sch}$ could be different for different services and could also be a function of the load in a cell. This functionality can be either located in RNC or in the serving Node B or operating systems.

According to an embodiment, the RoT target adjusting unit 4140 comprises a GBR BLER monitoring unit 4142 for monitoring the BLER of the GBR users (and the BLER of DCH users, only mention GBR users later). In a specific implementation, the RoT target adjusting unit 4140 is implemented in Node B. The measured BLER of the GBR users is used in adapting target RoT to improve the uplink load utilization without degrading the experience of GBR users (and the experience of DCH users as well).More specifically, if the BLERs for GBR users are around the corresponding BLER target, and/or the uplink power headroom (UPH) is not fully utilized (this measurement is available if the GBR user is a scheduled user), then the RoT target can be increased with a predefined step. On the contrary, if the BLERs of the GBR users (evidently) exceed the target BLER, and/or the UPH is fully utilized, the RoT target can be decreased with another predefined step.

Preferably, the BLER used to adapt RoT target can be based on statistics of multiple GBR users, e.g. $5^{th}$ percentile BLER in the BLER CDF curve.

Preferably, the RoT target increase step can be smaller than the RoT target decrease step, and the difference can depend on the BLER of GBR users.

With this RoT target adaptation, when the radio condition becomes appropriate and GBR users can tolerate higher interference, RoT target can accordingly be set higher, which gives more load room and an improved performance for non-GBR users and without violating the performance of GBR users.

Note that the RoT target adjustment can be implemented to give more load room for the non-GBR users either in combination with or independently of the over-load actions performed by the over-load handling unit 4116.

The Scheduler 4200 further comprises a user load scheduling unit 4220 for scheduling load to individual users based on the total uplink load budget determined by the uplink load control apparatus 4100 and the QoS requirements of the individual users, a User max data rate determining unit 4240 for determining the max data rate granted to the individual users based on the scheduled load for the respective individuals users and a over-scheduling handling unit 4260 for performing over-scheduling actions based on the BLER statics of the individuals users in order that the over-load can be handled more rapidly. If the over-load is determined, it means that the over-scheduling also exists in the scheduler 4200 and the over-scheduling actions are triggered. According to an embodiment, the over-scheduling handling unit 4260 can receive the BLER statics of the individuals users monitored by the non-GBR BLER monitoring unit 4122. Once the over-load is determined, the uplink load control apparatus 4100 will decrease the allocated load headroom for the EUL users. At the same time, the over-scheduling handling unit 4260 will reduce the allocated load for the users with higher BLER statics than required.

Note that the block diagram is just to illustrate embodiments of the invention, rather than limit the invention. The skilled person in the art knows that, without deviating from the spirit of the invention, some blocks or sub-block can be combined together into a new block or a sub-block of another block, all these blocks can be integrated into one single block and one block can be further subdivided into more sub-blocks. For example, among others, the over-load determining unit 4120 can be integrated into the UL load controller 4110 as a sub-block thereof.

Figure 5:
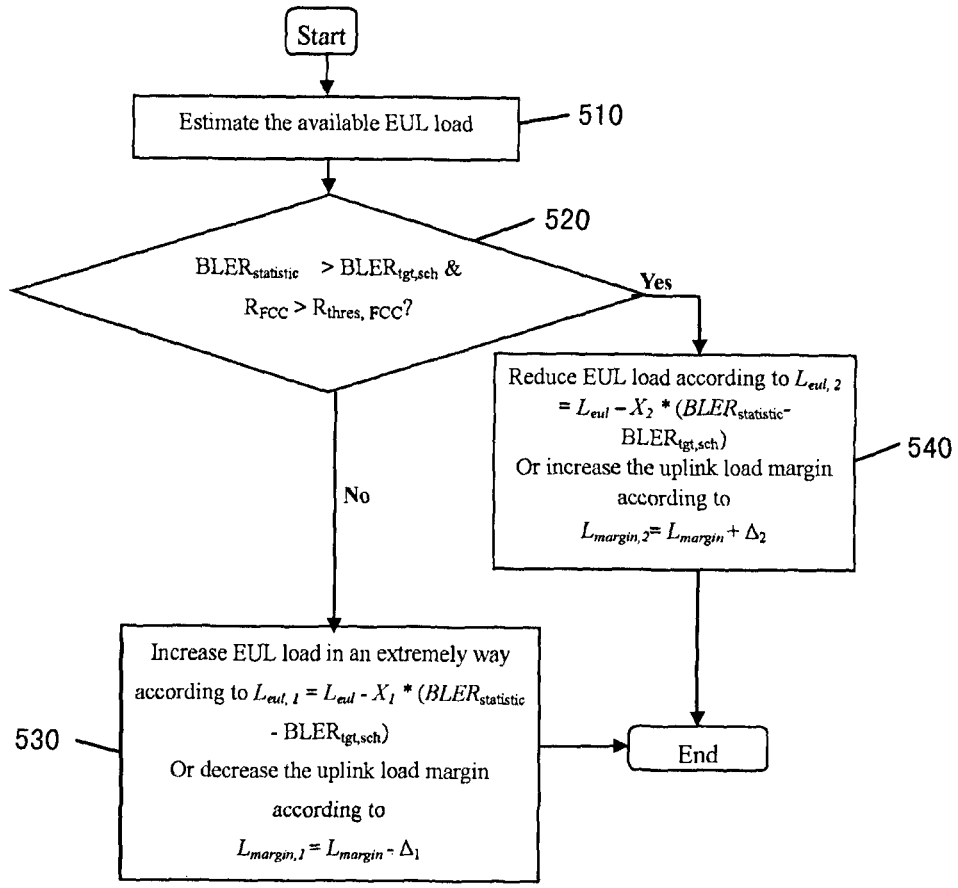
FIG. 5 schematically illustrates a flow chart of uplink load control method based on BLER statistics of users according to an embodiment of the invention.

FIG. 5 schematically illustrates a flow chart of an uplink load control method based on BLER statistics of users according to an embodiment of the invention. At the start of each EUL scheduling period, the total usable UL load for EUL users is estimated in Equation 8, at Step 510. Then at Step 520, the over-load detection is done based on the BLER statistic of targeted users by FCC and/or FCC active time ratio $R_{FCC}$ as explained in the Section of "Over-Load Determination".

If the BLER statistic of the targeted EUL users by FCC, $BLER_{statistic}$, is lower than the target BLER of the scheduler $BLER_{tgt,sch}$ and/or the FCC ratio $R_{FCC}$ does not exceed the predetermined threshold $R_{thres,\ FCC}$, it is determined that there is no over-load and it proceeds to Step 530.

At Step 530, the total usable load for EUL users is estimated in an aggressive manner. That is, the total usable load for EUL users is increased at Step 530 when no over-load is determined. Preferably, the total usable load is increased based on the BLER stastics $BLER_{statistic}$ of targeted users by FCC. More preferably, the total usable load is increased as shown in Equation 9, i.e. $L_{eul,1}=L_{eul}-X_1(BLER_{statistic}-BLER_{tgt,sch})$. Or equivalently to some extent, $L_{margin}$ is decreased by one step as in Equation 10, i.e. $L_{margin,1}=L_{margin}-\Delta_1$. In this way, the total usable load for EUL users can be allocated or increased using Equation 8 and Equation 9 (directly increase the total usable load for EUL users) or using Equation 8 and Equation 10 (via the updated load margin $L_{margin,1}$).

If, at Step 520, the BLER statistic of the targeted EUL users by FCC is higher than the target BLER of the scheduler $BLER_{tgt,sch}$ and/or FCC ratio $R_{FCC}$ exceeds the predetermined threshold $R_{thres,FCC}$, the over-load is determined and it proceeds to Step 540 to perform over-load actions.

At Step 540, the total usable load for EUL users is decreased when over-load is determined. Preferably, the total usable load is decreased based on the BLER stastics $BLER_{statistic}$ of targeted users by FCC. More preferably, the total usable load is decreased as in Equation 11, ie. $L_{eul,2}=L_{eul}-X_2(BLER_{statistic}-BLER_{tgt,sch})$. Or equivalently to some extent, $L_{margin}$ is increased by one step as in Equation 12, i.e. $L_{margin,2}=L_{margin}+\Delta_2$. In this way, the total usable load for EUL users can be allocated or decreased using Equation 8 and Equation 11 (directly decrease the total usable load for EUL users) or using Equation 8 and Equation 12 (via the updated load margin $L_{margin,2}$).

In an embodiment, $X_1$ and $X_2$ can be different. $\Delta_1$ and $\Delta_2$ can also be different.

According to an embodiment, the method further comprises adjusting a RoT target $RoT_{tgt}$, based on BLER statistics of GBR users. Preferably, the method comprises increasing the RoT target $RoT_{tgt}$ in order to increase load headroom available for non-GBR users without violating the performance of GBR users when the BLER statistics of the GBR users is less than required.

Note that the RoT target adjusting step can also be implemented by itself to give more load room for the non-GBR users independently of the uplink load control method. Alternatively, the RoT target adjusting step can also be implemented in combination with the uplink load control method to give further more load room for the non-GBR users.

In some embodiments of this invention, the BLER statistics of the served UL users is feed into the load controller/scheduler so that the uplink radio resource utilization is enhanced while the BLER of the served UL users is controlled within the acceptable range.

In some embodiments of this invention, by feedback BLER and FCC status to the load controller and scheduler, BLER of EUL users can be controlled in an acceptable range while maximizing the benefit of FCC in improving load utilization and consequently uplink throughput as much as possible. Moreover, target RoT adaptation based on BLER of GBR users can further increase load headroom available for non-GBR users in appropriate conditions without violating the performance of GBR users.

In some embodiments of this invention, uplink BLER statistics are taken into account when performing load control in base station or NodeB. More specifically, some embodiments provide BLER controlled aggressive load allocation with FCC. When the BLER of the served EUL users is controlled within a predetermined acceptable range, the uplink load is allocated as aggressive as possible and the FCC can also be utilized more aggressively in order to improve the uplink resource utilization while the system stability is ensured by FCC. The BLER range can be determined according to the QoS required by the served EUL users, the UL traffic situation, etc.

In some embodiments, the load allocation can be adjusted either directly by scheduler or via adaptation of the reserved load margin $L_{margin}$.

In some embodiments, the RoT target can be adjusted conditionally according to the BLER statistics of the GBR users (or DCH users, only GBR users is mentioned hereinafter) in different situations. When the GBR users' BLER is controlled within the acceptable range, the RoT target can be increased to increase the UL schedulable load headroom for EUL users. If the GBR users' BLER exceeds the acceptable range, the RoT target is reduced accordingly until the BLER returns to the acceptable range to ensure the QoS of the GBR users.

Above, the invention is described in connection with the specific embodiments of the invention. It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements, and by means of a suitably programmed computer.

In device or system claims enumerating several means, some or all of these means can be embodied by one and the same item of hardware. The mere fact that certain measures are recited in mutually different dependent claims does not indicate that a combination of these measures cannot be used to advantage.

The invention claimed is:

1. An uplink load control method used in a wireless communication system comprising:
   estimating uplink load budget in a cell of the wireless communication system;
   determining whether the cell is over-loaded using Block Error Rate (BLER) statistics of users in the cell;
   decreasing the uplink load budget if it is determined that the cell is over-loaded; and
   increasing the uplink load budget if it is determined that the cell is not over-loaded;
   wherein said uplink load budget comprises a total usable load for the users;
   wherein determining whether the cell is over-loaded using BLER statistics comprises determining whether the cell is over-loaded using BLER statistics of non-Guarded Bit Rate (non-GBR) users in the cell by determining the cell is over-loaded if the BLER statistics ($BLER_{statistic}$) of the non-GBR users exceed a predetermined BLER target ($BLER_{tgt\_sch}$).

2. The uplink load control method as claimed in claim 1, further comprising adjusting a Rise of Thermal (RoT) target ($RoT_{tgt}$), using BLER statistics of GBR users.

3. An uplink load control apparatus used in a wireless communication system comprising:
   a load estimation circuit configured to estimate an uplink load budget in a cell of the wireless communication system;
   an over-load determining circuit configured to determine whether the cell is over-loaded using Block Error Rate (BLER) statistics of users in the cell; and
   an over-load handling circuit configured to:
      decrease the uplink load budget if the over-load determining circuit determines the cell is over-loaded; and
      increase the uplink load budget if the over-load determining circuit determines the cell is not over-loaded;
   wherein said uplink load budget comprises a total usable load for the users;
   wherein the over-load determining circuit is configured to determine whether the cell is over-loaded using BLER statistics of non-Guarded Bit Rate (non-GBR) users in the cell;
   wherein the over-load determining circuit is configured to determine the cell is over-loaded if the BLER statistic ($BLER_{statistic}$) exceed a predetermined BLER target ($BLER_{tgt,sch}$).

4. The uplink load control apparatus as claimed in claim 3, further comprising:
   a Block Error Rate (BLER) monitoring circuit configured to measure the BLER statistics of the non-GBR users in the cell.

5. The uplink load control apparatus as claimed in claim 3, further comprising a RoT target adjusting circuit configured to adjust a Rise of Thermal (RoT) target ($RoT_{tgt}$), using BLER statistics of Guarded Bit Rate (GBR) users.

6. A base station in a wireless communication system comprising an uplink load control apparatus, the uplink load control apparatus comprising:
   a load estimation circuit configured to estimate an uplink load budget in a cell of the wireless communication system;
   an over-load determining circuit configured to determine whether the cell is over-loaded using Block Error Rate (BLER) statistics of users in the cell; and
   an over-load handling circuit configured to:
      decrease the uplink load budget if the over-load determining circuit determines the cell is over-loaded; and
      increase the uplink load budget if the over-load determining circuit determines the cell is not over-loaded;
   wherein said uplink load budget comprises a total usable load for the users;
   wherein the over-load determining circuit is configured to determine whether the cell is over-loaded using BLER statistics of non-Guarded Bit Rate (non-GBR) users in the cell;
   wherein the over-load determining circuit is configured to determine the cell is over-loaded if the BLER statistics $BLER_{statistic}$) exceed a predetermined BLER target ($BLER_{tgt,sch}$).

7. An uplink load control method used in a wireless communication system comprising:
   estimating uplink load budget in a cell of the wireless communication system;
   determining whether the cell is over-loaded using Block Error Rate (BLER) statistics of users in the cell;
   decreasing the uplink load budget if it is determined that the cell is over-loaded; and
   increasing the uplink load budget if it is determined that the cell is not over-loaded;
   wherein said uplink load budget comprises a total usable load for the users;
   wherein the increasing or decreasing of the uplink load budget is based on the BLER statistics ($BLER_{statistic}$) of targeted users by Fast Congestion Control (FCC); and
   wherein the uplink load budget comprises an Enhanced Uplink (EUL) load budget for EUL users, and wherein the increasing or decreasing of the uplink load budget comprises at least one of:
      decreasing the EUL load budget according to:

$$L_{eul,1}=L_{eul}-X_1(BLER_{statistic}-BLER_{tgt,sch})$$

where $L_{eul}$ and $L_{eul,1}$ respectively comprises the EUL load budget before and after the decrease of the EUL load budget, and $X_1$ comprises a coefficient to control a speed of decreasing the EUL load budget; and
      increasing EUL load budget according to:

$$L_{eul,2}=L_{eul}-X_2(BLER_{statistic}-BLER_{tgt,sch})$$

where $L_{eul}$ and $L_{eul,2}$ respectively comprise the EUL load budget before and after the increase of the EUL load budget, and $X_2$ comprises a coefficient to control a speed of increasing the EUL load budget.

8. The uplink load control method as claimed in claim 7, further comprising adjusting a Rise of Thermal (RoT) target ($RoT_{tgt}$), using BLER statistics of Guarded Bit Rate (GBR) users.

9. An uplink load control method used in a wireless communication system comprising:
   estimating uplink load budget in a cell of the wireless communication system;
   determining whether the cell is over-loaded using Block Error Rate (BLER) statistics of users in the cell; and
   decreasing the uplink load budget if it is determined that the cell is over-loaded; and
   wherein said uplink load budget comprises a total usable load for the users;
   wherein determining whether the cell is over-loaded further comprises determining whether the cell is over-loaded using Fast Congestion Control (FCC) action statistics in the cell; and
   wherein the FCC action statistics comprise any one of the following:

a ratio of FCC active time that an FCC is suppressing Rise of Thermal (RoT) peaks to a predetermined FCC monitoring period; and a ratio of a forced Transmit Power Control (TPC) down commands to a total TPC commands of targeted users by the FCC within a predetermined FCC action monitoring period.

10. The uplink load control method as claimed in claim 9, further comprising adjusting a Rise of Thermal (RoT) target (RoT$_{tgt}$), using BLER statistics of Guarded Bit Rate (GBR) users.

11. An uplink load control apparatus used in a wireless communication system comprising:
a load estimation circuit configured to estimate an uplink load budget in a cell of the wireless communication system;
an over-load determining circuit configured to determine whether the cell is over-loaded using Block Error Rate (BLER) statistics of users in the cell; and
an over-load handling circuit configured to:
decrease the uplink load budget if the over-load determining circuit determines the cell is over-loaded; and
increase the uplink load budget if the over-load determining circuit determines the cell is not over-loaded;
wherein said uplink load budget comprises a total usable load for the users;
wherein the over-load handling circuit is configured to increases or decrease the uplink load budget based on the BLER statistics (BLER$_{statistic}$) of targeted users by a Fast Congestion Control (FCC); and
wherein the uplink load budget comprises Enhanced Uplink (EUL) load budget for EUL users, and wherein the over-load handling circuit increasing or decreasing the uplink load budget by at least one of:
decreasing the EUL load budget according to:

$$L_{eul,1}=L_{eul}-X_1(BLER_{statistic}-BLER_{tgt,sch})$$

where $L_{eul}$ and $L_{eul,1}$ respectively comprise the EUL load budget before and after the decrease of the EUL load budget, and $X_1$ comprises a coefficient to control a speed of decreasing the EUL load budget; and increasing the EUL load budget according to:

$$L_{eul,2}=L_{eul}-X_2(BLER_{statistic}-BLER_{tgt,sch})$$

where $L_{eul}$ and $L_{eul,2}$ respectively comprise the EUL load budget before and after the increase of the EUL load budget, and $X_2$ comprises a coefficient to control a speed of increasing the EUL load budget.

12. The uplink load control apparatus as claimed in claim 11, further comprising a RoT target adjusting circuit configured to adjust a Rise of Thermal (RoT) target (RoT$_{tgt}$), using BLER statistics of Guarded Bit Rate (GBR) users.

13. An uplink load control apparatus used in a wireless communication system comprising:
a load estimation circuit configured to estimate an uplink load budget in a cell of the wireless communication system;
an over-load determining circuit configured to determine whether the cell is over-loaded using Block Error Rate (BLER) statistics of users in the cell; and
an over-load handling circuit configured to:
decrease the uplink load budget if the over-load determining circuit determines the cell is over-loaded; and
increase the uplink load budget if the over-load determining circuit determines the cell is not over-loaded;
wherein said uplink load budget comprises a total usable load for the users;
wherein the over-load determining circuit is further configured to determine whether the cell is over-loaded using Fast Congestion Control (FCC) action statistics in the cell; and
wherein the FCC action statistics comprise any one of the following:
a ratio of FCC active time that an FCC is suppressing Rise of Thermal (RoT) peaks to a predetermined FCC monitoring period; and
a ratio of a forced Transmit Power Control (TPC) down commands to a total TPC commands of targeted users by the FCC within a predetermined FCC action monitoring period.

14. The uplink load control apparatus as claimed in claim 13, further comprising a RoT target adjusting circuit configured to adjust a Rise of Thermal (RoT) target (RoT$_{tgt}$), using BLER statistics of Guarded Bit Rate (GBR) users.

15. A base station in a wireless communication system comprising an uplink load control apparatus, the uplink load control apparatus comprising:
a load estimation circuit configured to estimate an uplink load budget in a cell of the wireless communication system;
an over-load determining circuit configured to determine whether the cell is over-loaded using Block Error Rate (BLER) statistics of users in the cell; and
an over-load handling circuit configured to:
decrease the uplink load budget if the over-load determining circuit determines the cell is over-loaded; and
increase the uplink load budget if the over-load determining circuit determines the cell is not over-loaded;
wherein said uplink load budget comprises a total usable load for the users;
wherein the over-load handling circuit is configured to increases or decrease the uplink load budget based on the BLER statistics (BLER$_{statistic}$) of targeted users by a Fast Congestion Control (FCC); and
wherein the uplink load budget comprises Enhanced Uplink (EUL) load budget for EUL users, and wherein the over-load handling circuit increasing or decreasing the uplink load budget by at least one of:
decreasing the EUL load budget according to:

$$L_{eul,1}=L_{eul}-X_1(BLER_{statistic}-BLER_{tgt,sch})$$

where $L_{eul}$ and $L_{eul,1}$ respectively comprise the EUL load budget before and after the decrease of the EUL load budget, and $X_1$ comprises a coefficient to control a speed of decreasing the EUL load budget; and increasing the EUL load budget according to:

$$L_{eul,2}=L_{eul}-X_2(BLER_{statistic}-BLER_{tgt,sch})$$

where $L_{eul}$ and $L_{eul,2}$ respectively comprise the EUL load budget before and after the increase of the EUL load budget, and $X_2$ comprises a coefficient to control a speed of increasing the EUL load budget.

16. A base station in a wireless communication system comprising an uplink load control apparatus, the uplink load control apparatus comprising:
a load estimation circuit configured to estimate an uplink load budget in a cell of the wireless communication system;

an over-load determining circuit configured to determine whether the cell is over-loaded using Block Error Rate (BLER) statistics of users in the cell; and
an over-load handling circuit configured to:
  decrease the uplink load budget if the over-load determining circuit determines the cell is over-loaded; and
  increase the uplink load budget if the over-load determining circuit determines the cell is not over-loaded;
wherein said uplink load budget comprises a total usable load for the users;
wherein the over-load determining circuit is further configured to determine whether the cell is over-loaded using Fast Congestion Control (FCC) action statistics in the cell; and
wherein the FCC action statistics comprise any one of the following:
  a ratio of FCC active time that an FCC is suppressing Rise of Thermal (RoT) peaks to a predetermined FCC monitoring period; and
  a ratio of a forced Transmit Power Control (TPC) down commands to a total TPC commands of targeted users by the FCC within a predetermined FCC action monitoring period.

\* \* \* \* \*